(12) United States Patent
Wei et al.

(10) Patent No.: US 7,473,154 B2
(45) Date of Patent: Jan. 6, 2009

(54) METHOD FOR MANUFACTURING CARBON NANOTUBE FIELD EMISSION DISPLAY

(75) Inventors: Yang Wei, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 650 days.

(21) Appl. No.: 11/107,256

(22) Filed: Apr. 15, 2005

(65) Prior Publication Data

US 2005/0266766 A1    Dec. 1, 2005

(30) Foreign Application Priority Data

May 26, 2004    (CN) .................... 2004 1 0027405

(51) Int. Cl.
*H01J 9/00*    (2006.01)
(52) U.S. Cl. .................... 445/50; 445/51; 445/23
(58) Field of Classification Search ............. 445/49–51; 313/495–497, 309, 336, 351
See application file for complete search history.

(56) References Cited

U.S. PATENT DOCUMENTS 6,445,124 B1    9/2002    Asai et al.

FOREIGN PATENT DOCUMENTS

JP    2000-251614 A    9/2000

OTHER PUBLICATIONS

Zhaoxiang Zhang et al., "Field Emission of Carbon Nanotube Film", Vacuum Science and Technology, Jan. 2003, pp. 27-32, vol. 23, Issue 1, China.

*Primary Examiner*—Joseph L Williams
(74) *Attorney, Agent, or Firm*—Morris Manning Martin LLP; Tim Tingkang Xia, Esq.

(57) ABSTRACT

A method for manufacturing a carbon nanotube field emission display includes the steps of: (a) dispersing a plurality of carbon nanotubes on an array of cathode electrodes formed on an insulative substrate; (b) forming an array of insulation beams on the array of cathode electrodes, the insulation beams being perpendicular to a lengthways direction of the cathode electrodes; (c) forming a plurality of gate electrodes on tops of the insulation beams; (d) making the carbon nanotubes located near opposite sides of each gate electrode stand vertically on the cathode electrodes; and (e) packing and sealing a phosphor screen and side walls. The gate electrodes have the dual functions of driving electron emission and focusing emitted electrons. Thereby the carbon nanotube field emission display has high resolution and good display quality.

18 Claims, 5 Drawing Sheets

METHOD FOR MANUFACTURING CARBON NANOTUBE FIELD EMISSION DISPLAY

CROSS-REFERENCE TO RELATED APPLICATION

This application is related to one corresponding U.S. patent applications Ser. No. 11/092,494 entitled "TRIODE TYPE FIELD EMISSION DISPLAY WITH HIGH RESOLUTION," recently filed and having the same assignee as the instant application. The disclosure of the above-identified application is incorporated herein by reference.

BACKGROUND OF THE INVENTION

The present invention relates to methods for manufacturing field emission displays, and more particularly to methods for manufacturing carbon nanotube field emission displays.

Field emission displays (FEDs) are relatively new, rapidly developing flat panel display technologies. Compared to conventional technologies, e.g., cathode-ray tube (CRT) and liquid crystal display (LCD) technologies, field emission displays are superior in having a wider viewing angle, lower energy consumption, a smaller size, and a higher quality display.

Generally, field emission displays can be roughly classified into diode type structures and triode type structures. Diode type structures have only two electrodes, a cathode electrode and an anode electrode. Diode type structures are unsuitable for applications requiring high resolution displays, because the diode type structures require high voltages, produce relatively non-uniform electron emissions, and require relatively costly driving circuits. Triode type structures were developed from diode type structures by adding a gate electrode for controlling electron emission. Triode type structures can emit electrons at relatively low voltages.

Figure 11:
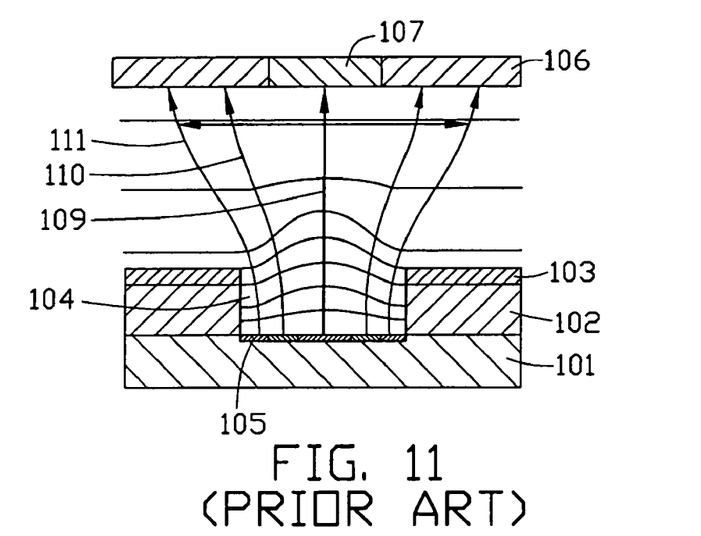
FIG. 11 is a cross-sectional view of a picture element of a conventional field emission display, showing electron emission characteristics thereof.

FIG. 11 is a cross-sectional view illustrating a conventional triode type field emission display corresponding to one picture element. Here, a picture element means a minimum unit of an image displayed by the field emission display. In a typical color field emission display, the color picture is obtained by a display system using three optical primary colors, i.e., R (red), G (green) and B (blue). Each one of the colors, e.g. R (red), is included in a respective single picture element. As an example of a conventional field emission display, a structure is explained below, in which electrons are emitted to excite a red fluorescent picture element to emit light.

As shown in FIG. 11, an insulation film 102 (e.g., an SiO2 film, 1 micron thick) is deposited on a substrate 101 by sputtering, a gate electrode 103 (e.g., an aluminum film, 200 nanometers thick) is deposited on the insulation film 102, and a tubular gate hole 104 is formed penetrating the gate electrode 103 and insulation film 102. An emitter 105 is formed with cathode material deposited on the substrate 101 at a bottom of the gate hole 104. An anode electrode 106 is disposed about 5 millimeters above the substrate 101. Fluorescent material 107 with red fluorescent properties is coated on part of the anode electrode 106 located just over the gate hole 104. In use, different voltages are applied to the emitter 105, the anode electrode 106 and the gate electrode 103. For example, about 5.1 kilovolts is applied to the anode electrode 106 and the fluorescent part, about 7.0 volts is applied to the emitter 105 made of cathode material, and about 100 volts is applied to the gate electrode 103. Thereby, equipotential surfaces (not labeled) are formed. Here, a distance between the anode electrode 106 and the gate electrode 103 is about 5 millimeters, and the voltage is about 5000 volts. Thus, an electric field between the both electrodes 106 and 103 is given by:

$$5000/5 [V/mm] = 1 [kV/mm]$$

On the other hand, a distance between the gate electrode 103 and the emitter 105 is 1 micron (10-3 millimeters), and the voltage is 100 volts. So, an electric field between the gate electrode 103 and the emitter 105 is given by:

$$100/10^{-3} [V/mm] = 100 [kV/mm]$$

Under this configuration, electrons can be extracted from the emitter 105 by the strong electric field of 100 kV/mm. The electrons are then accelerated toward the anode electrode 106 by the normal electric field of 1 kV/mm. However, electrons such as the electrons 110 and 111 diverge in directions slightly away from a central axis of the picture element while they travel toward the anode electrode 106. Only a portion of electrons such as the electrons 109 correctly reach the fluorescent material 107 of the target picture element. In field emission displays, the picture elements are generally arranged very closely together. Therefore the divergent elections are liable to reach the fluorescent material 107 of a neighboring picture element. Generally, the fluorescent material 107 of the neighboring picture element is either green or blue, such that a different color is generated.

Figure 12:
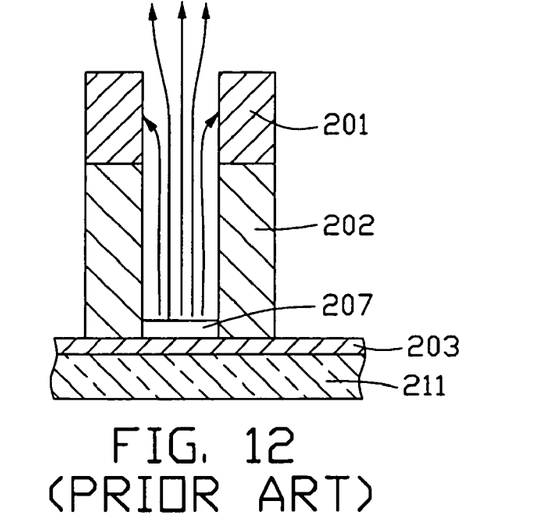
FIG. 12 is a cross-sectional view of part of another conventional field emission display, showing electron emission characteristics thereof.

U.S. Pat. No. 6,445,124, granted to Hironori Asai et al., discloses a field emission device structured to resolve the above-described problems. Referring to FIG. 12, the field emission device includes a cathode layer 203. The cathode layer 203 is made of a conductive thin film with a thickness of about 0.01 to 0.9 microns, and is formed by deposition or sputtering on an insulation substrate 211. An insulation layer 202 made of SiO2 is formed on the cathode layer 203. A gate electrode 201 is formed on the insulation layer 202. A circular hole (not labeled) with a diameter of 40 to 100 nanometers penetrating the gate electrode 201 and the insulation layer 202 is formed by a reactive ion etching (RIE) process. An electron emissive layer 207 is formed on the cathode layer 203 inside the hole. A ratio of L/S should be equal to or over 1, where S represents an aperture diameter of the hole, and L represents a typical shortest passing distance of electrons emitted from the electron emissive layer 207 to the gate electrode 201. When the ratio of L/S is equal to or over 1, paths of electrons emitted from the emissive layer 207 are controlled to become narrow. Only electrons that move in a direction approximately perpendicular to the electron emissive layer 207 can pass through the hole and reach the anode, such that the electrons reach the correct phosphor unit.

However, the efficiency of electron emission is low, because a portion of electrons emitted from the emissive layer 207 are absorbed by the gate electrode 201 or blocked by the insulation layer 202 when they travel in the hole in directions other than the direction perpendicular to the cathode layer 203. The greater the value of L/S, the more electrons are lost, and the lower the efficiency of electron emission. In addition, a high L/S value means a higher voltage applied to the gate electrode is required, in order to generate an electric field strong enough to extract electrons from the emissive layer 207.

Against this background, the field of carbon nanotubes (CNTs) has attracted much attention in recent years. Carbon nanotubes are very small tube-shaped structures essentially having a composition of a graphite sheet rolled into a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes can have extremely high electrical conductivity, very small diameters (much less than 100 nanometers), large aspect ratios (i.e. length/diameter ratios) (greater than 1000), and a tip-surface area near the theoretical limit (the smaller the tip-surface area, the more concentrated the electric field, and the greater the field enhancement factor). Thus carbon nanotubes can transmit an extremely high electrical current, and have a very low turn-on electric field (approximately 2 volts/micron) for emitting electrons. In summary, carbon nanotubes are one of the most favorable candidates for electrons emitters for electron emission devices, and can play an important role in field emission display applications. Carbon nanotube field emission displays employ carbon nanotubes as electron emitters. With the development of various different manufacturing technologies for carbon nanotubes, the research of carbon nanotube field emission displays has already yielded promising results.

Against this background, what is needed is an effective method for manufacturing a carbon nanotube field emission display. The carbon nanotube field emission display should have an improved efficiency of electron emission by emitting electrons at a relative low voltage, and should focus the emitted electrons to a desired picture element effectively. That is, the carbon nanotube field emission display is desired to have high resolution and good display quality.

SUMMARY OF THE INVENTION

The present invention provides a method for manufacturing a carbon nanotube field emission display. A preferred embodiment of the method includes the steps of:
(a) dispersing a plurality of carbon nanotubes on an array of cathode electrodes formed on an insulative substrate;
(b) forming an array of insulation beams on the array of cathode electrodes, the insulation beams being perpendicular to a lengthways direction of the cathode electrodes;
(c) forming a plurality of gate electrodes on tops of the insulation beams;
(d) making the carbon nanotubes located near opposite sides of each gate electrode stand vertically on the cathode electrodes; and
(e) packing and sealing a phosphor screen and side walls to thereby form the field emission display.

Compared with a conventional field emission display, the carbon nanotube field emission display manufactured by the preferred embodiment has the following advantages. The carbon nanotubes surround the gate electrodes and act as electron emitters. Such structure ensures that the gate electrodes have the dual functions of driving electrons and focusing emitted electrons. Thereby the carbon nanotube field emission display has high resolution and good display quality.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe a preferred embodiment of the present invention in detail.

Figure 6:
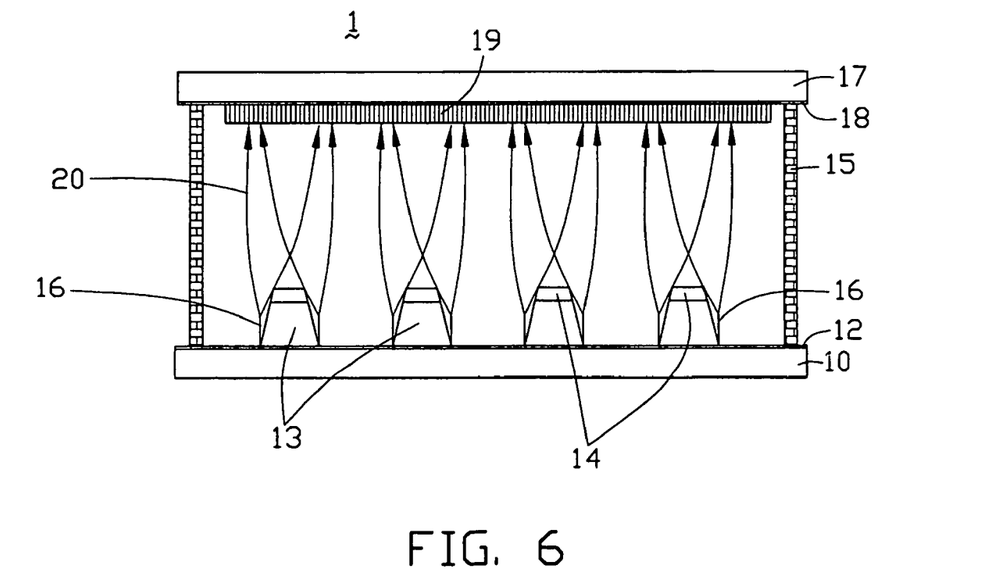
FIG. 6 is a schematic, side cross-sectional view of a carbon nanotube field emission display manufactured by the method in accordance with the preferred embodiment.

Referring initially to FIG. 6, a carbon nanotube field emission display 1 manufactured by a method in accordance with a preferred embodiment of the present invention is shown. The field emission display 1 includes: an array of parallel cathode electrodes 12 formed on an insulative substrate 10; an array of parallel insulation beams 13 disposed on the array of cathode electrodes 12 and being perpendicular to a lengthways direction of the cathode electrodes 12; a plurality of gate electrodes 14 made of a metallic material (preferably metal with excellent electrical conductivity) formed on tops of the insulation beams 13; a plurality of carbon nanotubes 16 functioning as electron emitters for emitting electrons, formed on portions of the cathode electrodes 12 near opposite sides of each gate electrode 14 respectively; an anode electrode 18 made of an ITO thin film formed on a surface of a transparent glass substrate 17 and facing the gate electrodes 14; and a light emitter like a phosphor layer 19 which can emit light when bombarded by electrons 20 formed on a surface of the anode electrode 18. The field emission display 1 is vacuum-sealed. The anode electrode 18 on the glass substrate 17 is supported by side walls 15, so that the anode electrode 18 is spaced apart from the gate electrodes 14. An inner vacuum chamber (not labeled) is thereby defined between the anode electrode 18 and the array of cathode electrodes 12.

The insulative substrate 10 can be made of a flat sheet of glass or other insulative material. The cathode electrodes 12 are each made of a conductive material, e.g. an indium-tin-oxide (ITO) thin film or a metallic thin film. Each cathode electrode 12 is shaped as a long bar or strip.

Preferably, the carbon nanotubes 16 stand vertically on the cathode electrodes 12. A height of the carbon nanotubes 16 is lower than a thickness of the insulation beams 13, so that tops of the carbon nanotubes 16 are a distance below a bottom of each gate electrode 14. This avoids short-circuiting between the cathode electrodes 12 and the gate electrode 14 via the carbon nanotubes 16. However, the height of the carbon nanotubes 16 is not subjected to any other limitations, such as the limitation of L/S $\geqq 1$ in U.S. Pat. No. 6,445,124. In other words, the carbon nanotubes 16 can almost but not quite reach the gate electrode 14. Preferably, in order to lower a turn-on voltage, the tops of the carbon nanotubes 16 should be as close to the gate electrodes 14 as possible without causing short-circuiting.

The insulation beams 13 are shaped as long bars or strips. Preferably, each insulation beam 13 has a trapezoidal cross-section, wherein a width of a bottom of the insulation beam 13 is greatest and a width of a top of the insulation beam 13 is smallest. That is, the insulation beam 13 gradually tapers upward from its greatest width to its smallest width.

Referring to FIGS. 1 to 6, a preferred embodiment of the method includes the steps of:
  (a) dispersing a plurality of carbon nanotubes 16 on an array of cathode electrodes 12 formed on an insulative substrate 10;
  (b) forming an array of insulation beams 13 on the array of cathode electrodes 12, the insulation beams 13 being perpendicular to a lengthways direction of the cathode electrodes 12;
  (c) forming a plurality of gate electrodes 14 on tops of the insulation beams 13;
  (d) making the carbon nanotubes 16 located near opposite sides of each gate electrode 14 stand vertically on the cathode electrodes 12; and
  (e) packing and sealing a phosphor screen and side walls 15 to thereby form the field emission display 1 (as shown in FIG. 6).

Figure 1:
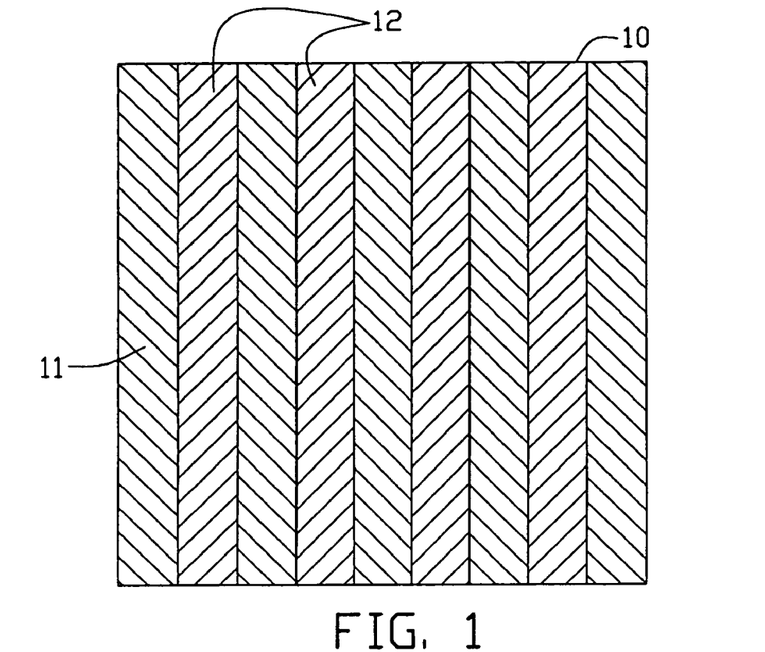
FIG. 1 is a schematic, top view showing cathode electrodes and portions of hydrophobic photoetching glue alternately formed on a substrate in accordance with a preferred embodiment of the present invention.
Figure 2:
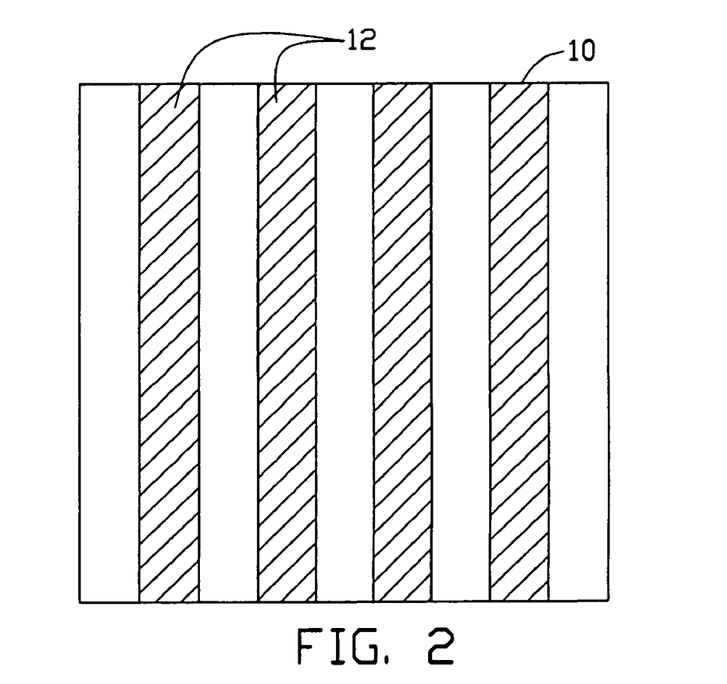
FIG. 2 is similar to FIG. 1, but showing the portions of the hydrophobic photoetching glue removed.

Step (a) can be performed by coating carbon nanotube plasma on the cathode electrodes 12. Alternatively, step (a) can be performed as follows:
  (a1) forming a plurality of parallel hydrophilic cathode electrodes 12 on the insulative substrate 10;
  (a2) coating a hydrophobic photoetching glue layer 11 on the insulative substrate 10;
  (a3) wiping off the photoetching glue covered on the cathode electrodes 12 by a photoetching technique;
  (a4) forming a carbon nanotube solution by mixing a plurality of carbon nanotubes 16 in an organic solvent, and ultrasonically dispersing the carbon nanotubes in the organic solvent;
  (a5) immersing the insulative substrate 10 in the carbon nanotube solution to make the carbon nanotubes 16 adhere to the cathode electrodes 12; and
  (a6) wiping off the residual photoetching glue by using an eluent such as acetone.

Figure 3:
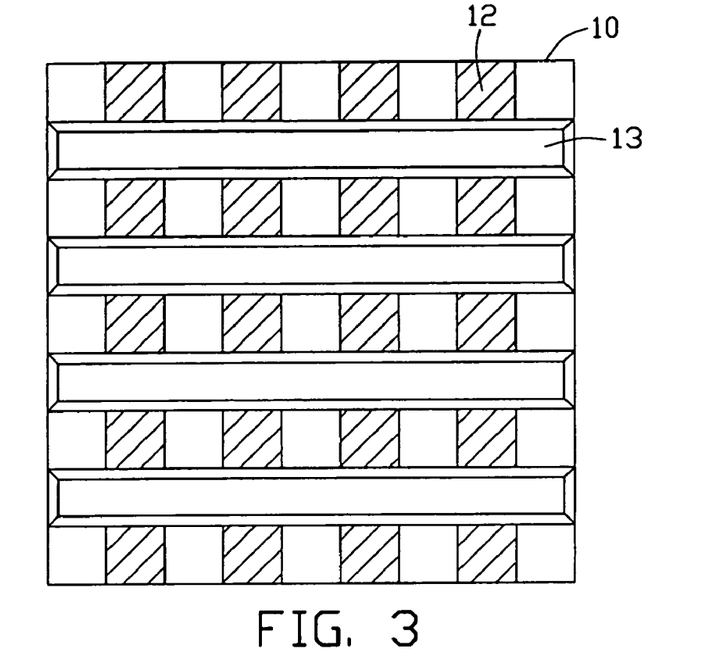
FIG. 3 is similar to FIG. 2, but showing insulation beams formed on the cathode electrodes, the insulation beams being perpendicular to a lengthways direction of the cathode electrodes.

In step (b), the insulation beams 13 are made of a glass material. The insulation beams 13 are formed by printing glass plasma on the array of cathode electrodes 12 by means of silk screen printing, and then sintering the glass plasma (as shown in FIG. 3). Thus, some carbon nanotubes 16 are completely covered by the insulation beams 13. However, other carbon nanotubes 16 each have one end partly covered by the insulation beams 13, and the other end exposed to the insulation beams 13. It is these other carbon nanotubes 16 that can act as electron emitters.

Figure 4:
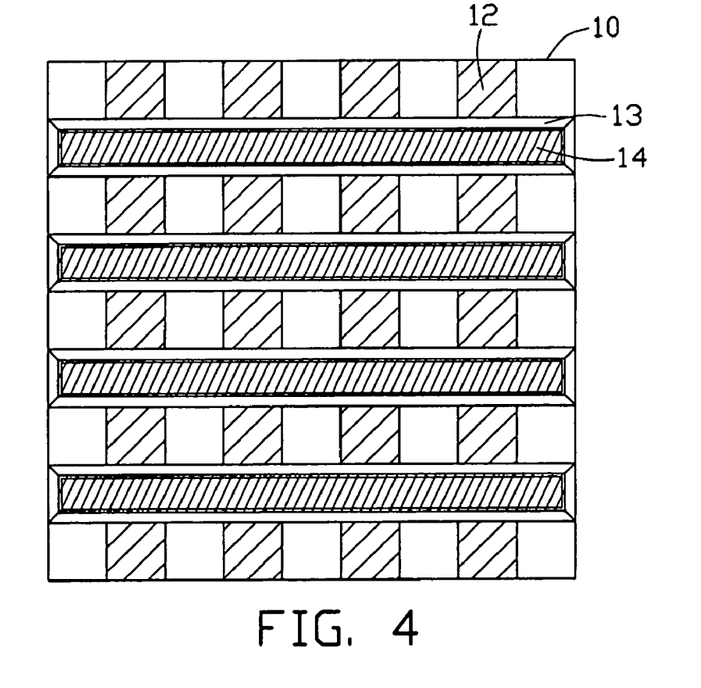
FIG. 4 is similar to FIG. 3, but showing a plurality of gate electrodes formed on tops of the insulation beams.

In step (c), the gate electrodes 14 are generally made of a metallic material, such as silver or copper. In the preferred embodiment, the gate electrodes 14 are made of silver. The gate electrodes 14 can be formed by printing silver plasma on tops of the insulation beams 13, and then sintering the silver plasma (as shown in FIG. 4).

Figure 5:
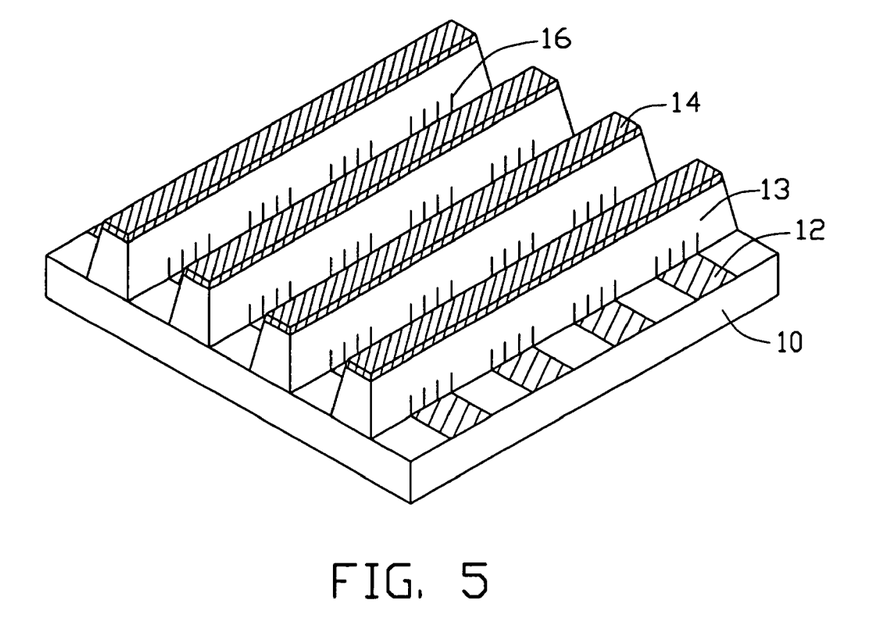
FIG. 5 is an isometric view corresponding to FIG. 4, but also showing carbon nanotubes located near sides of the gate electrodes, the carbon nanotubes standing vertically on the cathode electrodes.

Step (d) can be performed by attaching adhesive tapes (not shown) on the cathode electrodes 12, and then drawing up the adhesive tapes. The carbon nanotubes 16 located near opposite sides of each gate electrode 14 thereby stand vertically on the cathode electrodes 12. Alternatively, step (d) can be performed by applying a strong electric field force to the carbon nanotubes 16 located near opposite sides of each gate electrode 14, to make these carbon nanotubes 16 stand vertically on the cathode electrodes 12. The vertical carbon nanotubes 16 act as electron emitters. In step (e), the phosphor screen includes a transparent substrate 17, an anode layer 18, and a phosphor layer 19.

In use, different voltages are applied to the anode electrode 18, the gate electrodes 14, and the cathode electrodes 12. For example, a thousand volts to several thousands of volts are applied to the anode electrode 18, several tens of volts to a hundred volts are applied to the gate electrodes 14, and a zero or grounded voltage is applied to the cathode electrodes 12. Electrons 20 are extracted from the carbon nanotubes 16 by a strong electric field generated by the gate electrodes 14, and accelerated toward the phosphor layer 19 by an electric field generated by the anode electrode 18. Thereby, bombardment of the phosphor layer 19 by the electrons generates visible light of desired colors to emit from the phosphor layer 19.

Each gate electrode 14 is located at a position corresponding to a center of a corresponding picture element of the phosphor layer 19. The carbon nanotubes 16 functioning as electron emitters are positioned adjacent opposite sides of the gate electrode 14. The combination of these two features can be called a center-gated triode field emission structure. In this center-gated triode field emission structure, the gate electrode 14 functions not only to extract electrons from the carbon nanotubes 16, but also to focus the extracted electrons on a center area of the corresponding picture element of the phosphor layer 19. That is, the electrons extracted from the carbon nanotubes 16 are concentrated and directed to a narrow point at the phosphor layer 19 by the electric field generated by the gate electrode 14. Hence, electron bombardment of the phosphor layer 19 can be precisely controlled, and a high resolution display can be realized.

Further detailed structures of the field emission display 1, including a mechanism of focusing electrons and other features, will be described in detail below.

Figure 7:
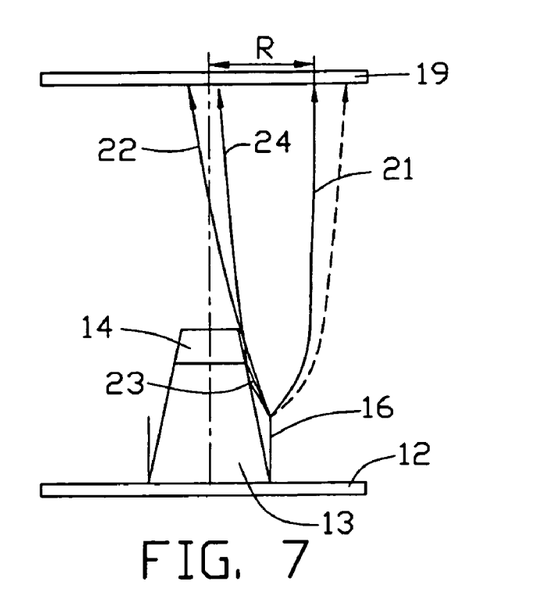
FIG. 7 is an enlarged view of part of FIG. 6, showing paths of electrons emitted from a carbon nanotube emitter of the carbon nanotube field emission display.

Referring to FIG. 7, paths of electrons emitted from a carbon nanotube 16 are shown. It is noted that there are in fact many carbon nanotubes 16 distributed at the opposite sides of each gate electrode 14. However, only two carbon nanotubes 16 are shown in FIG. 7, and only some electrons emitted from the carbon nanotube 16 at the right side of the gate electrode 14 are illustrated in FIG. 7. Electrons emitted from other carbon nanotubes 16 at both sides of the gate electrode 14 are subject to the same electric field and move in a similar way.

Generally, the electrons emitted from the carbon nanotube 16 can be classified into four kinds: external electrons 21, internal electrons 22, obstructed electrons 23, and reflected electrons 24. The external electrons 21 initially move in directions generally away from the central gate electrode 14, but are subject to the electric field force and are attracted back somewhat toward the central gate electrode 14 during their travel. The external electrons 21 finally arrive at a position of the phosphor layer 19 that is a distance R away from a center point of the corresponding picture element of the phosphor layer 19. The distance R is less than the corresponding distance in a conventional field emission display (the path of a corresponding electron emitted in the conventional field emission display is shown as a dashed line in FIG. 7). The internal electrons 22 initially move in directions generally slightly toward to the central gate electrode 14, and are subject to the electric field force and attracted closer toward the gate electrode 14 without contacting the gate electrode 14. The internal electrons 22 finally arrive at a position of the phosphor layer 19 at a side of the center point opposite to the carbon nanotube 16. A distance from this position to the center point is less than the distance R. The obstructed electrons 23 initially move in directions generally toward to the central gate electrode 14, and are subjected to the electric field force and attracted closer toward the gate electrode 14. The obstructed electrons 23 contact the gate electrode 14, and are blocked and absorbed by the gate electrode 14. That is, the obstructed electrons 23 do not reach the phosphor layer 19. The reflected electrons 24 initially move in directions generally toward the insulation beam 13, and are subjected to the electric field force and attracted closer toward the gate electrode 14. The reflected electrons 24 contact the insulation beam 13, and are reflected by the insulation beam 13 toward the phosphor layer 19. The reflected electrons 24 finally arrive at a position of the phosphor layer 19 in the vicinity of the center point.

Thus it can be seen that the greatest diameter of the area on the phosphor layer 19 being bombarded by electrons is 2R, which is less than the corresponding area of the conventional field emission display. The gate electrode 14 is located in a center of the carbon nanotubes 16 provides excellent electron focusing capability. A majority of electrons emitted from the carbon nanotubes 16 are concentrated in the vicinity of the center point of the phosphor layer 19 corresponding to the gate electrode 14.

It is noted that the electron focusing capability can be enhanced by increasing the voltage applied to the gate electrode 14 and/or reducing the voltage applied to the anode electrode 18, or by enlarging a distance between the gate electrode 14 and the anode electrode 18. In addition, the gate electrode 14 can capture more obstructed electrons 23 if a thickness of the gate electrode 14 is increased.

Figure 8:
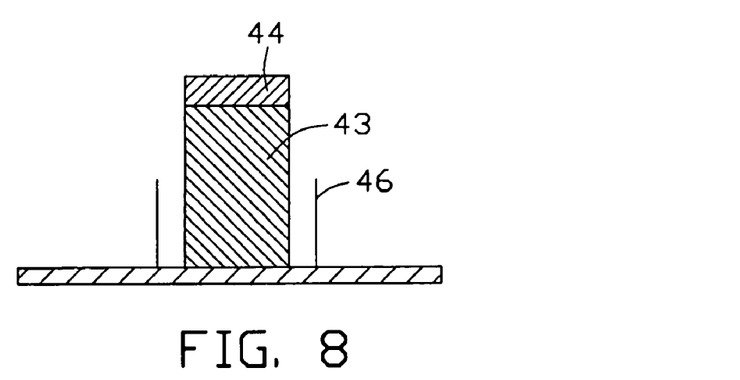
FIG. 8 is essentially a schematic, side cross-sectional view of an alternative carbon nanotube emitter of a carbon nanotube field emission display of the present invention.
Figure 9:
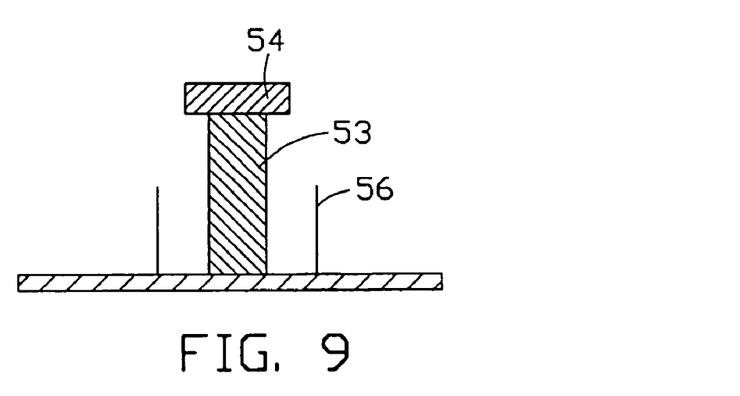
FIG. 9 is essentially a schematic, side cross-sectional view of a further alternative carbon nanotube emitter of a carbon nanotube field emission display of the present invention.
Figure 10:
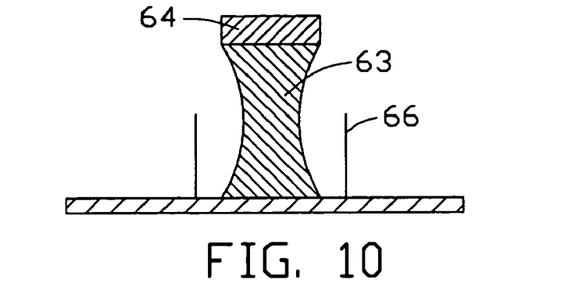
FIG. 10 is a essentially schematic, side cross-sectional view of a still further alternative carbon nanotube emitter of a carbon nanotube field emission display of the present invention.

Referring to FIGS. 8 to 10, insulation beams having shapes other than wedge shapes can be employed in the field emission display 1. In FIG. 8, an insulation beam 43 with a rectangular cross-section is shown. A gate electrode 44 having a same width as that of the insulation beam 43 is formed on the insulation beam 43. Carbon nanotubes 46 stand at opposite sides of the insulation beam 43 below the gate electrode 44. In FIG. 9, an insulation beam 53 with a rectangular cross-section is shown. A gate electrode 54 having a width greater than that of the insulation beam 53 is formed on the insulation beam 53. Carbon nanotubes 56 stand at opposite sides of the insulation beam 53 below the gate electrode 54. In FIG. 10, a double-concave insulation beam 63 is shown. A gate electrode 64 is formed on a top of the beam layer 63. A width of the gate electrode 64 is the same as a width of the top of the insulation beam 63. Carbon nanotubes 66 stand at opposite sides of the insulation beam 63 below the gate electrode 64.

It is also noted that even though the electron emitters are preferably carbon nanotubes, the electron emitters are not limited to carbon nanotubes. Other structures and materials having suitable field emission tips can be employed; for example, carbon fibers, graphitic carbon, diamond carbon, or metallic emitters.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A method for manufacturing a carbon nanotube field emission display, comprising the steps of:
    (a) dispersing a plurality of carbon nanotubes on an array of cathode electrodes formed on an insulative substrate;
    (b) forming an array of insulation members on the array of cathode electrodes, the insulation members being transverse to a lengthways direction of the cathode electrodes;
    (c) forming a plurality of gate electrodes on tops of the insulation members;
    (d) making the carbon nanotubes located near opposite sides of each gate electrode stand substantially vertically on the cathode electrodes; and
    (e) packing and sealing a phosphor screen and side walls.

2. The method as claimed in claim 1, wherein step (a) comprises coating carbon nanotube plasma on the cathode electrodes.

3. The method as claimed in claim 1, wherein step (a) comprises the steps of:
    (a1) forming a plurality of parallel hydrophilic cathode electrodes on the insulative substrate;
    (a2) coating a hydrophobic photoetching glue layer on the insulative substrate;
    (a3) wiping off the photoetching glue covered on the cathode electrodes;
    (a4) forming a carbon nanotube solution;
    (a5) immersing the insulative substrate in the carbon nanotube solution to make carbon nanotubes adhere to the cathode electrodes; and
    (a6) wiping off the residual photoetching glue.

4. The method as claimed in claim 1, wherein a height of each carbon nanotube is less than a thickness of the insulation members.

5. The method as claimed in claim 1, wherein the insulation members are made of a glass material.

6. The method as claimed in claim 5, wherein the insulation members are formed by printing glass plasma on the cathode electrodes, and then sintering the glass plasma.

7. The method as claimed in claim 1, wherein the insulation members are shaped as bars or strips.

8. The method as claimed in claim 7, wherein each insulation member has a trapezoidal cross-section, with a width of a bottom of the insulation member being greater than a width of a top of the insulation member.

9. The method as claimed in claim 1, wherein the gate electrodes are formed by printing silver plasma on tops of the insulation members, and then sintering the silver plasma.

10. The method as claimed in claim 1, wherein step (d) is performed by attaching adhesive tapes on the cathode electrodes, and then drawing off the adhesive tapes.

11. The method as claimed in claim 1, wherein step (d) is performed by applying an electric field force to the carbon nanotubes.

12. The method as claimed in claim 1, wherein the cathode electrodes are each made of a conductive thin film.

13. The method as claimed in claim 12, wherein the conductive thin film comprises an ITO (Indium-Tin Oxide) thin film.

14. The method as claimed in claim 1, wherein the phosphor screen comprises a transparent substrate, an anode layer, and a phosphor layer.

15. A method for manufacturing a field emission display, comprising the steps of:

placing at least one cathode electrode on an insulative substrate;

dispersing a plurality of carbon nanotubes on said at least one cathode electrode;

providing an anode electrode, having a light emitter disposed next thereto, spaced from said at least one cathode electrode and said plurality of carbon nanotubes thereon;

forming a gate electrode spaced from said at least one cathode electrode and located between said anode electrode and said plurality of carbon nanotubes so that a projection of said gate electrode on said at least one cathode electrode is substantially surrounded by said plurality of carbon nanotubes;

treating said surrounding ones of said plurality of carbon nanotubes next to said projection of said gate electrode so as to assure that each of said surrounding ones of said plurality of carbon nanotubes is substantially vertical to said at least one cathode electrode; and packing to seal said insulative substrate and said anode electrode as a whole so as to form said field emission display.

16. The method as claimed in claim 15, wherein said gate electrode is formed on an insulation member which is partially seated on said at least one cathode electrode and extends transverse to a lengthways extending direction of said at least one cathode electrode.

17. A method to arrange and effect a field emission display, comprising the steps of:

providing an array of cathode electrodes and at least one anode electrode, having a light emitter thereon, spaced from said array of cathode electrodes in said field emission display;

dispersing a plurality of carbon nanotubes on each of said array of cathode electrodes;

placing a gate electrode spaced from said each of said array of cathode electrodes and located between said at least one anode electrode and said plurality of carbon nanotubes on said each of said array of cathode electrodes; and treating ones of said plurality of carbon nanotubes right next to a projection of said gate electrode on said each of said array of cathode electrodes so as to assure that said ones of said plurality of carbon nanotubes are substantially vertical to said each of said array of cathode electrodes.

18. The method as claimed in claim 17, wherein said gate electrode is formed on a insulation member which extends transverse to be partially seated on more than one cathode electrode of said array of cathode electrodes.

* * * * *